United States Patent [19]

Dezawa et al.

[11] 4,069,164

[45] Jan. 17, 1978

[54] PROCESS FOR PRODUCING FERROMAGNETIC POWDER

[75] Inventors: Shin-ichiro Dezawa; Koji Sasazawa; Tatsuji Kitamoto, all of Odawara, Japan

[73] Assignee: Fuji Photo Film Co., Ltd., Minami-ashigara, Japan

[21] Appl. No.: 701,914

[22] Filed: July 1, 1976

[30] Foreign Application Priority Data

July 2, 1975 Japan .................................. 50-82075

[51] Int. Cl.² ...................... C01G 49/06; C01G 49/08; G11B 5/64
[52] U.S. Cl. .............................. 252/62.62; 252/62.56; 427/127
[58] Field of Search .................... 252/62.56, 62.62; 423/633, 634; 427/127

[56] References Cited

U.S. PATENT DOCUMENTS

| | | | |
|---|---|---|---|
| 3,075,919 | 1/1963 | Gruber et al. .................... | 252/62.56 |
| 3,243,375 | 3/1966 | Jeschke ............................. | 252/62.56 |

FOREIGN PATENT DOCUMENTS

| | | | |
|---|---|---|---|
| 2,413,430 | 10/1974 | Germany .......................... | 252/62.56 |
| 2,036,612 | 2/1971 | Germany .......................... | 252/62.56 |
| 2,235,383 | 2/1973 | Germany .......................... | 252/62.56 |
| 40-22055 | 9/1965 | Japan ................................. | 252/62.56 |

OTHER PUBLICATIONS

Umeki et al., "Chem Abstracts", vol. 82, 1975, 79751v.

*Primary Examiner*—Jack Cooper
*Attorney, Agent, or Firm*—Sughrue, Rothwell, Mion, Zinn and Macpeak

[57] ABSTRACT

In a process for producing ferromagnetic powder which comprises adding an aqueous solution containing $Co^{+2}$ ions, with or without another cation or cations, and an alkali solution to a suspension of ferromagnetic iron oxide, and heating the mixture to produce ferromagnetic iron oxide containing the metal provided by such an ion (s), the improvement wherein the heating is carried out in the presence of an oxidizing agent.

22 Claims, No Drawings

PROCESS FOR PRODUCING FERROMAGNETIC POWDER

BACKGROUND OF THE INVENTION

1. Field of the Invention

This invention relates to ferromagnetic iron oxides, more specifically, to a process for producing a ferromagnetic material having good stability to pressure and heat, a high coercive force which undergoes little change with time, and a narrow coercive force distribution, which is capable of providing magnetic tapes with improved SP (print through) ratios and erasure characteristics.

2. Description of the Prior Art

This invention relates to an improvement in the methods shown, for example, in Japanese Patent Publications 5,515/61, 4,825/62 and 49,475/74 wherein ferrite is precipitated on acicular particles, and in the methods shown, for example, in Japanese Patent Applications (Laid Open) 108,599/74, 37,667/75 and 37,668/75, wherein increased coercive force is attained by precipitation of a Co-containing compound in solution. Such iron oxides having a high coercive force obtained merely by a precipitation in an aqueous solution have better stability to heat and other properties with the passage of time, such as the print through ratio, than a magnetic material obtained by heating Co-containing iron oxide at temperatures as high as 300° to 500° C to diffuse Co uniformly in the particles. Such a method involves simple process steps, and is suitable for commercial produciton.

However, there is a saturation point in the coercive force, and even by increasing the amount of Co added, it is extremely difficult to raise the coercive force to more than 500 to 600 Oe. Thus, the resulting iron oxide is not entirely satisfactory for use in magnetic tapes designed for high density recording.

SUMMARY OF THE INVENTION

It is one object of this invention to provide an improvement in the above processes involving reaction in aqueous solution to give an iron oxide having good stability and high coercive force, which is characterized by using an oxidizing agent.

According to this invention, there is provided a process for producing ferromagnetic powder which comprises adding an aqueous solution containing $Co^{+2}$ ions, or both $Co^{+2}$ ions and one or more other cations, and an alkali solution to a suspension of ferromagnetic iron oxide, and heating the mixture to produce ferromagnetic iron oxide containing the metal provided by such an ion or ions, wherein the heating is carried out in the presence of an oxidizing agent.

DETAILED DESCRIPTION OF THE INVENTION

The ferromagnetic iron oxide used in this invention includes, for example, maghemite ($\gamma$-$Fe_2O_3$; $FeO_x$, $X = 1.50$), magnetic ($Fe_3O_4$; $FeO_x$, $x = 1.33$), Berthollide iron oxides (iron oxides having a degree of oxidation intermediate maghemite and magnetite; $FeO_x$ in which $1.33 < x < 1.50$), and partly oxidized metallic iron, most preferably such iron where the average composition is such that, if represented by the formula $FeO_x$, $x$ is greater than about 0.5. These iron oxides have an acicular ratio of about 2/1 to about 20/1, preferably 4/1 to 12/1, and an average particle length of about 0.3 to about 1.5 $\mu$, preferably 0.4 to 1 $\mu$m. Maghemite and magnetite usually have a coercive force (Hc) of about 250 to 450 Oe. The Berthollide iron oxides obtained by oxidizing or reducing maghemite or magnetite can be represented as approximately $FeO_{1.35}$; such have a coercive force about 30 Oe greater than maghemite or magnetite. The above described iron oxides wherein $x$ is $1.33 < x < 1.50$ are preferably used in this invention. It is to be noted, in this regard, that the proportion of ferromagnetic irox oxide in the system is not overly important, with exemplary proportions being given in the Examples.

The aqueous solution containing $Co^{+2}$ ions with or without one or more other cations is an aqueous solution having dissolved therein water soluble salts of metals yielding such ions. Examples of such other cations include $Cr^{+3}$, $Cr^{+6}$, $Mn^{+2}$, $Fe^{+2}$, $Fe^{+3}$, $Ni^{+2}$ and $Zn^{+2}$. These ions are included in the above mentioned ferromagnetic iron oxides by the process of this invention.

Water soluble cobalt salts are compounds which yield $Co^{+2}$ ions in water, and include, for example, inorganic salts, inorganic acid salts, organic acid salts, halides or complex salts of cobalt. It is most preferred that the solubility in water be greater than 2g/100ml of water at 25° C(hereinafter merely g/ml).

Specific examples of such cobalt salts are cobalt inorganic acid salts such as cobalt sulfate, cobalt nitrate, cobalt perchlorate, cobalt hexafluorosilicate, cobalt ammonium sulfate and cobalt ammonium chloride; cobalt halides such as cobalt chloride, cobalt bromide, cobalt fluoride, and cobalt iodide; cobalt organic acid salts such as cobalt acetate, cobalt citrate, cobalt tartrate, and cobalt formate; cobalt complex salts such as hexammine cobalt chloride, hexammine cobalt nitrate, ethylenediamine cobalt chloride and cesium hexafluorocobalt. Of these, the chlorides, sulfates, nitrates, bromides, fluorides, iodides, perchlorates, acetate, benzoates, hexammine chlorides, hexammine nitrate salts, hexammine sulfate salts, aquopentammine chlorides, ethylenediamine chlorides, and ammonium sulfate salts of cobalt are especially suitable.

The amount of the water soluble cobalt salt is about 0.5 to about 10 atomic percent, preferably 0.8 to 5 atomic percent, based on the Fe element of the ferromagnetic iron oxide.

Where $Co^{+2}$ ion is used in combination with another cation or cations, they are added so that the total amount of the water soluble cobalt salt and a water soluble metal salt of the one or more other cations such as $Cr^{+3}$, $Cr^{+6}$, $Mn^{+2}$, $Fe^{+2}$, $Fe^{+3}$, $Ni^{+2}$ or $Zn^{+2}$ becomes about 0.5 to about 10 atomic percent, preferably 0.8 to 5 atomic percent, based on the Fe element of the ferromagnetic iron oxide. The ratio between the $Co^{+2}$ ions and the other cation(s) is such that the proportion of the $Co^{+2}$ ion is at least ⅓ based on the above atomic percent, and the proportion of the other cation(s) is not more than ⅔, based on the above atomic percent.

Water soluble chromium salts are compounds which yield $Cr^{+3}$ or $Cr^{+6}$ ions in water. Such chromium salts preferably have a water solubility greater than 2 g/100 ml at 25° C. They include inorganic acid salts, oganic acid salts, chromium halides and metal or ammonium salts of chromates and dichromates, etc.

Specific examples of such chromium salts are chromium inorganic acid salts such as chromium nitrate, chromium sulfate, chromium thiocyanate, chromium potassium sulfate and chromium sulfate; chromium organic acid salts such as chromium acetate; chromium halides such as chromium chloride, chromium bromide, chromium fluoride and chromium iodide; and chromates or dichromates such as chromyl chloride, chromyl fluoride, ammonium chromate, sodium chromate, potassium chromate, ammonium dichromate, sodium dichromate and potassium dichromate.

Where it is desired to form hydroxides, the use of water soluble Cr (III) salts is desirable.

Water soluble manganese salts are compounds which yield $Mn^{+2}$ ions in water. Such manganese salts peferably have a water solubility greater than 2 g/100 ml at 25° C.

Specific examples of such manganese salts are manganese inorganic acid salts such as manganese sulfate, manganese nitrate, manganese hypophosphite, manganese ferrocyanide, manganese ferricyanide, maganese potassium chloride, maganese thiocyanide, manganese pyrophosphate, manganese hydrogen phosphate, manganese phosphite and manganese ammonium sulfate; manganese oganic acid salts such as manganese formate, maganese acetate, manganese benzoate, manganese cyclohexanebutyrate, manganese butyrate, manganese lactate, manganese valerate, manganese succinate, manganese salicylate and manganese phenolsulfonate; and manganese halides such as manganese chloride, manganese bromide and manganese iodide. Of these, the chlorides, sulfates, nitrates, bromides, formates, acetates, and benzoates are especially suitable.

Water soluble iron salts are compounds which yield $Fe^{+2}$ or $Fe^{+3}$ ions in water; they preferably have a solubility in water greater than 2 g/100 ml at 25° C and include, for example, ferrous chloride, ferrous perchlorate, ferrous bromide, ferrous nitrate, ferrous iodide, ferrous sulfate, and ferrous ammonium sulfate (the above compounds yield $Fe^{+2}$ ions), and ferric chloride, ferric perchlorate, ferric bromide, ferric nitrate, ferric iodide, ferric sulfate, and ferric ammonium sulfate (the above compounds yield $Fe^{+3}$ ions).

Water soluble nickel salts are compounds which yield $Ni^{+2}$ ions in water; they preferably have a solubility in water greater than 2g/100ml at 250° and include, for example, the inorganic salts, inorganic acid salts, organic acid salts, and complex salts of nickel. Specific examples of these compounds are nickel chloride, nickel sulfate, nickel nitrate, nickel bromide, nickel iodide, nickel perchlorate, nickel hypophosphite, nickel formate, nickel benzenesulfonate, hexamine nickel chloride, nickel ammonium chloride, nickel ammonium sulfate, $\{NiCl_2[P(C_6H_5)_3]_2\}$, $\{NiP[C_3H_6As(CH_3)_2]_3(CN)\}^{30}$, $LiNiO_2$, $K_3(NiF_6)$, $K_2(NiF_6)$, $\{Ni[(CH_3)_2AsC_6H_4As(CH_3)_2]_2Cl_2\}Cl$, nickel borate, nickel bromate, nickel citrate, nickel cyclohexanebutyrate, nickel cyclopentamethylene dithiocarbamate, nickel dibutyl dithiocarbamate, nickel dimethyl dithiocarbamate, ethylenediamine nickel sulfate, nickel acetate, nickel pentametylene dithiocarbamate, nickel phosphite, nickel potassium cyanide, nickel potassium sulfate, nickel fluorosilicate, nickel tartrate, nickel tetrammine nitrite, nickel thiocyanate. Of these, the chlorides, sulfates, nitrates, bromides, iodides, perchlorates, formates, benzenesulfonates, diaquotetrammine nitrate salts, hexammine chlorides, and ammonium sulfates of nickel are especially suitable.

Water soluble zinc salts are compounds which yield $Zn^{+2}$ ions in water; they preferably have a water solubility greater than 2 g/100 ml at 250° C and include for example, the inorganic salts, inorganic acid salts, organic acid salts, and complex salts of zinc. Specific examples of these zinc compounds are zinc chloride, zinc bromide, zinc iodide, zinc chlorate, zinc bromate, zinc chlorite, zinc perchlorate, zinc sulfate, zinc nitrate, zinc nitrite, zinc borate, zinc metaborate, basic zinc borate, zinc hexafluorosilicate, zinc hypophosphite, zinc glycerophosphate, zinc bichromate, zinc citrate, zinc thionate, zinc dithionate, zinc tetrathionate, zinc pentathionate, zinc thiocyanate, zinc benzoate, zinc acetate, zinc salicylate, zinc picrate, zinc permanganate, zinc hydrogen phosphate, zinc formate, zinc ethylsulfate, zinc phenolsulfonate. Of these, the chlorides, bromides, iodides, chlorates, perchlorates, sulfates, nitrates, formates, acetates, and benzoates are especially suitable.

Examples of the alkalis used in this invention include inorganic alkalis and oganic alkalis, such as alkali metal hydroxides and/or carbonates, alkaline earth metal hydroxies, etc. Preferred alkali metals are lithium, sodium and potassium. A preferred alkaline earth metal is barium. Preferred organi alkali materials have a solubility of at least 2 b/100ml at 25° C in water, and include monoamines, polyamines, aliphatic amines and aromatic amines. Specific examples of the alkali used in this invention include potassium hydroxide, sodium hydroxide or lithium hydroxide, sodium carbonate, potassium carbonate, ammonia water, monoethanolamine or p-phenylenediamine, and mixtures thereof. These alkaline substances are used as a solution in water.

The total amount of the alkali is preferably such that the $(OH^-)$ concentration of the slurry becomes at least 0.5 N after the $Co^{+2}$ ion (with or without the other cation(s)) has been neutralized. If the amount is such as to give an $(OH^-)$ concentration of less than 0.5, the additon of the alkali does not produce a satisfactory effect of increasing the coercive force (Hc) of the ferromagnetic iron oxide. Generally, the amount of alkali is within the range of from about 1.0 to about 3.0 N.

The oxidizing agent used in this invention can be freely selected from gaseous, liquid and solid compounds which are soluble in the reaction solution described above. When the oxidizing agent is a solid, it is preferably added as an aqueous solution thereof. The oxidizing agents utilized in the present invention most preferably illustrate a standard electrode potential (at 25° C) of greater than about −0.076 V (i.e., positive or 0 to about −0.076 V).

Specific examples of oxidizing agents include air, oxygen, hydrogen peroxide, nitrate ions, nitrite ions, chlorate ions, perchlorate ions, permanganate ions, and chromate ions. These ions are provided by dissolving inorganic acids, anhydride acids, ammonium salts, metal salts such as alkali metals, alkaline earth metals and other metals which can be dissolved in water, in water. The important characteristic which these materials must exhibit, of course, is that they are capable of dissolving in water.

Nitrate ions are provided by compounds such as nitric acid, ammonium nitrate, lithium nitrate, sodim nitrate, potassium nitrate, beryllim nitrate, magnesium nitrate, calcium nitrate, strontium nitrate, barium nitrate, aluminum nitrate, chromium nitrate, manganese nitrate, iron nitrate, cobalt nitrate, nickel nitrate, copper nitrate, zinc nitrate, silver nitrate, cadmim nitrate, tin nitrate, mercury nitrate, and zinc nitrate.

Nitrite ions are provided by compounds such as ammonium nirite, sodium nitrite, potassium nitrite, barium nitrite, and silver nitrite.

Chlorate ions are provided by compounds such as chloric acid, ammonium chlorate, calcim chlorate, barium chlorate, silver chlorate, and lead chlorate.

Perchlorate ions are provided by compounds such as perchloric acid, ammonium perchlorate, lithium perchlorate, sodium perchlorate, magnesium perchlorate, calcium perchlorate, strontium perchlorate, barium perchlorate, manganese perchlorate, iron perchlorate, cobalt perchlorate, nickel perchlorate, silver perchlorate, and lead perchlorate.

Permanganate ions are provided by compounds such as ammonium permanganate, sodium permanganate, potassium permanganate, calcium permanganate, and barium permanganate.

Chromate ions are provided by compounds such as chromic anhydride, ammonium chromate, ammonium bichromate, lithium chromate, sodium chromate, potassium chromate, barium chromate, silver chromate, silver bichromate, mercury chromate, and lead chromate.

The above oxidizing agent, when a gas, e.g., air or oxygen, is added in an amount of at least about 0.1 liter/min, preferably 0.1 to 10 liter/min, per liter of the reaction solution. A liquid or solid oxidizing agent is added in an amount of at least about 0.1 equivalent, preferably 0.1 to 5 equivalents, more preferably 0.5 to 2 equivalents, based on the $Co^{+2}$ ion in the reaction solution.

The use of the oxidizing agent in excessive amounts gives substantially the same results. It is considered that the effect in accordance with this invention increases as a result of oxidizing a part of the $Co^{+2}$ ion and/or other cations.

Usually, the oxidizing agent is added to the reaction system after the aqueous alkali solution and the aqueous solution containing a $Co^{+2}$ ion with or without another cation(s) have been added to the suspension of ferromagnetic powder. However, the time of adding it is not particularly limited if the oxidizing agent functions while the reaction mixture is heat aged at near 100° C with the $Co^{+2}$ ions precipitating as a result of reaction with the alkali.

The process of this invention is described in greater detail below. First, the starting ferromagnetic iron oxide is dispersed fully in water, and, with stirring, one of the following five steps is performed.

A. Add an aqueous solution containing $Co^{+2}$ ions with or without another cation(s), and then an aqueous alkali solution.

B. Add the aqueous alkali solution, and then the aqueous solution containing $Co^{+2}$ ions with or without another cation(s).

C. Add the aqueous alkali solution in two portions, one before adding the aqueous solution containing $Co^{+2}$ ions with or without another cation(s), and the other thereafter (portion-wise addition).

D. Add the aqueous alkali solution and then the aqueous solution containing $Co^{+2}$ ions with or without another cation(s) both in at least two portions, and finally add the aqueous alkali solution (repeated portion-wise addition).

E. Add the aqueous alkali solution first in an amount of 0.7 to 1.4 equivalents, preferably 1 equivalent, into the aqueous solution containing $Co^{+2}$ ions (and other cations, if desired) to neutralize the same, and then add the balance of the aqueous alkali solution.

It is generally most convenient to divide the alkali solution and the $Co^{+2}$ with or without other cation(s) solution into equal portions for each portion-wise addition for the particular solution involved, though, of course, this is not mandatory. Often, when the alkali solution is initially added, the amount used will be 0.7 to 1 time that required to neutralize the $Co^{+2}$ and other cations.

After adding these solutions, they must be homogenized in the suspension of the ferromagnetic powder by thorough stirring. Usually, the stirring is performed for 30 to 60 minutes, but this is not mandatory.

By carrying out precipitation in multiple stages as in methods (C) and (D), uniform precipitation of the Co or other metals can be effected. This serves to increase the coercive force of the ferromagnetic powder and to narrow the coercive force distribution in accordance with this invention. Stirring is carried out by conventional means, for example, a stirrer, ultrasonic vibrations, etc.

As stated above, the time of adding the oxidizing agent is not limited, but it is preferably added after introducing the cation(s) and alkali(s) by any of the methods (A), (B), (C), (D) and (E). It is more preferred to add the oxidizing agent before the temperature of the system reaches the reaction temperature, and the most preferred time of addition is after adding the cations ($Co^{+2}$ ions and other cations, if present) and alkali solutions and before the temperature of the system reaches the reaction temperature.

For convenience of operation, the suspension of the ferromagnetic powder is advantageously heated after all of the reaction solutions have been added, but it may be heated from the outset. The heating temperature is desirably about 80° to about 150° C, and, most desirably, the reaction is carried out in the boiling state at 90° to 105° C.

If the temperature is lower than 80° C, long periods of time are required to increase the coercive force of the ferromagnetic powder, which is commercially disadvantageous. If it is above 105° C, no merits are obtained in performing the reaction in a reactor at atmospheric pressure. It is, of course, possible, however, to heat the suspension of the ferromagnetic powder at a temperature of a high as about 150° C using an autoclave. Pressure is not overly important in the present invention, but, of course, if the heating temperature is over 105° C, a pressure over one atmosphere is necessary.

Generally, heating will be conducted for more than about 30 minutes.

In order to remove excess alkali in the reaction mixture after reaction, it is washed with water until its pH becomes not more than about 9.5, preferably not more than 8.5. It is then dehydrated by, for example, filtration or centrifugal separation. The residue is then dried at a temperature of about 40° to 200° C. The drying time is not important, and can be freely selected so as to obtain the desired degree of drying.

The above process steps are applicable when the starting ferromagnetic iron oxide is maghemite ($\gamma$-$Fe_2O_3$). In the case of magnetite ($Fe_3O_4$) or Berthollide iron oxide, the final drying step must be carried out in an inert gas such as $N_2$ or an inert gas such as He, Ne or Ar. This is because magnetite and Berthollide iron oxide are likely to be oxidized by heat when heat dried in the air.

The above process steps thus afford ferromagnetic iron oxide containing Co, or both Co and at least one metal selected from Cr, Mn, Fe, Ni, and Zn.

Where the resulting ferromagnetic iron oxide is magnetite or Berthollide iron oxide, its degree of oxidation can be adjusted by further treating it in an oxidizing atmosphere, for example, as disclosed in Japanese Patent Publications 5,009/64 and 10,307/64.

The effect obtainable by the present invention is that ferromagnetic iron oxide containing Co or both Co and one or more other metals having a high coercive force can be obtained by using an oxidizing agent when heating the above described reaction solution. According to the invention, Co and other metals can be uniformly incorporated, and ferromagnetic iron oxide of superior stability can be obtained.

In the process of this invention described hereinabove, heating at about 200° to 500° C carried out in conventional processes after drying (disclosed, for example, in Japanese Patent Publication 27,719/72, Japanese Patent Application (Laid Open) 119,196/74, and U.S. Pat. No. 3,725,126) is not required to obtain ferromagnetic iron oxides having a high coercive force. However, the coercive force thereof can be even further increased by performing such a heating.

The ferromagnetic iron oxide obtained by the process of this invention can be used in various applications. Especially when it is used for magnetic recording, products having good characteristics are obtained.

A ferromagnetic powder of this invention obtained in the above manner can, for example, be dispersed in a binder, which is coated using an organic solvent on a base (support) and dried to form a magnetic layer for use as a magnetic recording medium.

The methods of preparing magnetic coating compositions used in this invention are described in detail, e.g., in Japanese Patent Publications 186/68, 28,043/72, 28,045/72, 28,046/72, 28,048/72, and 31,445/72, and U.S. pat. No. 3,943,012. The magnetic coating compositions described in the above specifications contain as main components a ferromagnetic powder, a binder and a solvent for coating, and, optionally, contain additives such as a dispersing agent, a lubricant, an abrasive and an antistatic agent.

Hitherto known thermoplastic resins, thermosetting resins, or mixtures threof, can be used as binders for the ferromagnetic metal powder of the present invention.

Suitable thermoplastic resins are those resins which have a softening point of about 150° C or less, an average molecular weight of about 10,000 to 200,000, and a degree of polymerization on the order of about 200 to 2,000, e.g., a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a polyvinyl fluoride, a vinylidene chloride-acrylonitrile copolymer, a butadiene-acrylonitrile copolymer, a polyamide resin, polyvinyl butyral, cellulose derivatives such as cellulose acetate butyrate, cellulose diacetate, cellulose triacetate, cellulose propionate, cellulose nitrate, and the like, a styrene-butadiene copolymer, a polyester resin, a chlorovinyl ether-acrylate copolymer, an amino resin, various synthetic rubber based thermoplastic resins such as neoprene rubber, isoprene rubber, styrene-butadiene rubber, etc., and mixtures thereof.

Suitable examples of these resins which can be used are described in Japanese Patent Publications 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1973, U.S. Pat. Nos. 3,144,352, 2,419,420, 3,499,789, 3,713,887, etc.

Suitable thermosetting resins have a molecular weight of about 200,000 or less as a coating solution, and when heated after coating and drying, the molecular weight becomes infinite due to reactions such as condensation, addition, and the like. Of these resins, preferred resins are those resins which do not soften or melt before the resin thermally decomposes. Representative examples of these resins are a phenol resin, an epoxy resin, a polyurethane hardening type resin, a urea resin, a melamine resin, an alkyd resin, a silicone resin, an acryl based reactive resin, an epoxy-polyamide resin, a mixture of a high molecular weight polyester resin and an isocyanate prepolymer, a mixture of a methacrylic acid copolymer and diisocyanate prepolymer, a mixture of a polyesterpolyol and a polyisocyanate, a urea-formaldehyde resin, a mixture of a low molecular weight glycol, a high molecular weight diol and triphenylmethane triisocyanate, a polyamine resin, and mixtures thereof, etc.

Suitable examples of these resins which can be used are described in Japanese Patent Publications 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 2,437,510, 3,597,273, 3,781,210, 3,781,211, etc.

These binders can be used individually or in combination with each other, and other additives can be added to the binders. The weight ratio of the ferromagnetic powder to the binder is generally about 100:10 to 100:20. When the proportion of the binder is less than about 10 parts by weight, the ability of the binder to bind the fine ferromagnetic powder becomes weak, and the ferromagnetic powder tends to come off from the magnetic layer. This leads to the disadvantge that the fine ferromagnetic powder that has come of adheres to the magnetic head, or damages the surface of the magnetic layer. On the other hand, when the proportion of the binder is above about 200 parts by weight, the magnetic flux density of the magnetic layer is reduced because the non-magnetic property of the binder dominates the layer characteristics.

The magnetic recording layer may contain, in addition to the aforesaid binder and the ferromagnetic powders, additives such as a dispersing agent, a lubricant, an abrasive and an antistatic agent.

The dispersing agents used include aliphatic acids having 12 to 18 carbon atoms ($R_1COOH$ wherein $R_1$ is an alkyl group having 11 to 17 carbon atoms) such as caprylic acid, capric acid, lauric acid, myristic acid, palmitic acid, stearic acid, oleic acid, elaidic acid, linolic acid, linolenic acid and stearolic acid; metal soaps comprising an alkali metal (such as Li, Na and K) or an alkaline earth metal (such as Mg, Ca and Ba) salt of the above aliphatic acids; lecithin, etc. In addition, higher alcohols having 12 or more carbon atoms and sulfuric esters can be used. These dispersing agents are added in an amount of 1 to 20 parts by weight per 100 parts by weight of the binder.

The lubricants used include silicone oil, carbon black, graphite, a carbon black-grafted polymer, molybdenum disulfide, tungsten disulfide, aliphatic esters obtained from monobasic aliphatic acid having 12 to 16 carbon atoms and monohydric alcohols having 3 to 12 carbon atoms, aliphatic esters obtained from monobasic aliphatic acids having 17 or more carbon atoms and monohydric alcohols (the carbon atoms of the monobasic aliphatic acid and the carbon atoms of the monohydric alcohol total 21 to 23), etc. These lubricants are added in an amount of 0.2 to 20 parts by weight per 100 parts by weight of the binder. These lubricants are described, e.g., in Japanese Patent Publications 23,889/68, Japanese Patent Applications 28,647/67 and 81,543/68, U.S. Pat. Nos. 3,470,021, 3,492,235, 3,497,411, 3,523,086, 3,625,760, 3,630,772, 3,634,253, 3,642,539 and 3,687,725, *IBM Technical Disclosure Bulletin*, Vol. 9, No. 7, page 779 1966), *ELEKTRONIK*, No. 12, page 380 (1961), etc.

The abrasives used include those which are generally used, such as fused alumina, silicon carbide, chromium oxide ($Cr_2O_3$), corundum, artificial corundum, diamond, artificial diamond, garnet and emery (main components: corundum and magnetite). The average particle diameter of these abrasives is 0.05 to 5 $\mu$, preferably 0.1 to 2 $\mu$. These abrasives are added in an amount of 7 to 20 parts by weight per 100 parts by weight of the binder. These abrasives are described in Japanese Patent Application 26,749/73, U.S. Pat. Nos. 3,007,807, 3,041,196, 3,293,066, 3,630,910 and 3,687,725, British patent specification No. 1,145,349, and West German Pat. No. 853,211.

Examples of the antistatic agent are electrically conductive powders such as graphite or carbon black. The amount of the antistatic agent, when used, is about 5 parts by weight per 100 parts by weight of the ferromagnetic powder.

These antistatic agents are described, for example, in Japanese Patent Publications 2613/65, 24881/72, 15440/73, and 3642/75, U.S. Pat. Nos. 2,804,401, 3,293,066, and 3,647,539, British patent specification No. 793,520, and *IBM Technical Disclosure Bulletin*, Vol. 6, No. 12, page 4 (May 1964).

In order to disperse the ferromagnetic powder into the binder, conventional methods are utilized. For example, ball milling, vibratory milling, sand milling, colloid milling and combinations thereof can be used. In some cases, ultrasonic vibration can be jointly used therewith. Various types of kneaders can be used in performing the dispersion. Examples include a two-roll mill, a three-roll mill, a ball mill, a pebble mill, a trommel, a sand grinder, a Szegvari attritor, a high speed impeller, a high speed stone mill, a high speed impact mill, a disperser, a kneader, a high speed mixer, a honogenizer, and an ultrasonic dispersing apparatus.

Various useful techniques relating to kneading and dispersing are described in T.C. Patton, *Paint Fow and Pigment Dispersion*, 1964, John Wiley & Sons, and in U.S. Pat. Nos. 2,581,414 and 2,855,156.

Magnetic recording layers are formed by dissolving the above components in an organic solvent to make a coating composition and then coating the same on a support.

The thickness of the support used is conventional and is about 5 to 50 $\mu$m, preferably about 10 to 40 $\mu$m. The material used for the support includes polyesters such as polyethylene terephthalate and polyethylene-2,6-naphthalate, polyolefins such as polypropylene, cellulose derivatives such as cellulose triacetate and cellulose diacetate, polycarbonate, and the like.

For preventing static discharge or preventing transfer printing, the above supports may have a back coat on the surface opposite the surface provided with the magnetic layer. Descriptions of back coats are found, e.g., in U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420 and 3,166,688, etc.

The supports may be in any shape such as a tape, sheet, card, disc or drum, and various materials can be used depending upon the shape desired and end use contemplated.

The aforesaid magnetic recording layer can be coated on the support by various conventional methods including air doctor coating, blade coating, air knife coating, squeeze coating, impregnation coating, reverse roll coating, transfer roll coating, gravure coating, kiss coating, cast coating and spray coating. Other coating methods can also be used. The details of these methods are descried in Coating Engineering, pp. 253 to 277, Asakura Publisher (Mar. 20, 1971).

The organic solvents which can be used for coating include ketones such as acetone, methyl ethyl ketone, methyl isobutyl ketone and cyclohexanone; alsohols such as methanol, ethanol, propanol and butanol; esters such as methyl acetate, ethyl acetate, butyl acetate, ethyl lactate and glycol monoethyl ether acetate; glycol ethers such as ether, glycol dimethyl ether, glycol monoethyl ether and dioxane; aromatic hydrocarbons such as benzene, toluene and xylene; chlorinated hydrocarbons such as methylene chloride, ethylene chloride carbon tetrachloride, chloroform, ethylene chlorohydrin and dichlorobenzene; and the like.

The magnetic layer coated on the support by the above method is dried after, if desired, the coating has been subjected to a treatment for orienting the magnetic powder in the layer. Suitable treatments for orienting the magnetic powder in the layer are disclosed in U.S. Pat. Nos. 1,949,840, 2,796,359, 3,001,891, 3,172,776, 3,416,949, 3,473,960 and 3,681,138; Japanese Patent Publications 3427/1957, 28368/1964, 23624/1965, 23625/1965, 13181/1966, 13043/1973 and 39722/1973. If required, the magnetic layer can be subjected to a surface-smoothening treatment, or cut to the desired shape, to thereby form the magnetic recording material of this invention. Suitable suface-smoothening techniques are disclosed in U.S. Pat. Nos. 2,688,567, 2,998,325 and 3,783,023, and German Patent Application (POI) 2,405,222.

In the above orienting treatment for the magnetic layer, the orienting magnetic field can be either an AC or DC magnetic field with a field strength of about 500 to 2,000 gauss. The drying temperature can range from about 50 to about 100° C, and the drying time is about 3 to 10 minutes.

In the surface-smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 kg/cm, and the surface temperature of the metal roll is kept at about 35° to 150° C. The rate of the treatment is about 5 to 120 meter/min. When the pressure and temperature are below the lower limits of the above specified ranges, the effect of the surface-smoothening treatment is difficult to achieve. Pressures and temperatures higher than the upper limits of the above specified ranges are not preferred because the support of the magnetic recording material is deformed. When the treating rate is less than about 5 meter/min, the operating efficiency is low, and if the rate is above 120 meter/min, operation is difficult.

The most preferred process for the production of a magnetic recording medium disclosed above is the process disclosed in Japanese Patent Application (OPI) 41506/1975 (corresponding to U.S. Patent Application Ser. No. 498,337, filed on Aug. 19, 1974).

The following Examples specifically illustrate the present invention.

EXAMPLE 1

200 g of Berthollide iron oxide ($FeO_x$; $x = 1.45$; $Fe^{+3}/Fe^{+2} = 9/1$; average particle length 0.5 μm; acircular ratio 8/1; coercive force Hc 398 Oe) was dispersed in 2 liters of water at room temperature, and with stirring which was continued over the entire course of the reaction, an alkaline solution obtained by dissolving 80 g of sodium hydroxide in 600 ml of water was added thereto. The mixture was further stirred for 30 minutes. Then, a solution of 20 g of cobalt sulfate ($CoSO_4.7H_2O$) in 400 ml of water which contained $Co^{+2}$ ions was added 30 minutes after the addition of the alkali, and, with continued stirring, the mixture was heated at a temperature elevation rate of 100° C/hour to about 100° C. The mixture was then boiled for 4 hours at about 100° C.

Each of the oxidizing agents indicated in Table 1 below was added 15 minutes after the aqueous solution containing $Co^{+2}$ ions was added (when the temperature as about 55° C), and reacted. After the reaction, the product was thoroughly washed with water, separated by filtration, and dried at 60° C for 17 hours in air to give samples 1 to 5, respectively.

The coercive forces of these samples were measured in an exterior magnetic field of 5 K Oe using a fluxmeter of the type designed for Vibrating Sample Magnetometer (Model VSM-III, a product of Toei Kogyo K.K.). The results are shown in Table 1.

TABLE 1

| Sample No. | Oxidizing Agent | Amount Added | Final Coercive Force (Hc) (Oe) |
|---|---|---|---|
| 1 | Air | Blown at a rate of liter/minute | 615 |
| 2 | Sodium nitrate ($NaNO_3$) | 5 g | 620 |
| 3 | Potassium permanganate ($KMnO_4$) | 5 g | 610 |
| 4 | Potassium bichromate | 5 g | 620 |
| 5 (control) | — | — | 576 |

EXAMPLE 2

In the procedure of Example 1, the alkali solution was divided into two portions each in an amount of 300 g, one of which as added before the addition of the $Co^{+2}$ ion-containing aqueous solution, and the other of which as added after it. 15 minutes after the raising the temperature, a solution of 5 g of sodium nitrate ($NaNO_3$) as an oxidizing agent in 50 ml of water was added. Otherwise, the procedure was the same as in Example 1. Sample No. 6 was thus obtained. Furthermore, in the above procedure, the addition of the oxidizing agent was omitted to thereby form sample No. 7 (comparison).

The coercive forces of these Samples were measured in the same way as in Example 1, and the results are shown in Table 2.

TABLE 2

| Sample No. | Final Coercive Force Hc (Oe) |
|---|---|
| 6 | 625 |
| 7 | 610 |

From the results obtained in Examples 1 and 2, it was confirmed that the ferromagnetic iron oxides in accordance with the process of this invention have higher coercive forces than those obtained by conventional methods which do not use oxidizing agents, and that the effect is greater when the alkali is added portion-wise.

The characteristic feature of the present invention is that high coercive forces can be obtained without a heat treatment at temperatures of as high as 300° to 500° C. If desired, however, the esulting ferromagnetic iron oxide can be so heat treated in order to adjust is coercive forces.

When procedure (D) described hereinabove is employed in the process of this invention, the metals derived from the selected ions are deposited in layers since it involves plural precipitations. It is believed, therefore, that the resulting ferromagnetic iron oxide powder can be utilized in applications which afford new properties by controlling the diffusion of ions between adjacent layers.

While the invention has been described in detail and with reference to specific embodiments thereof, it will be apparent to one skilled in the art that various changes and modifications can be made therein without departing from the spirit and scope thereof.

What is claimed is:

1. A process for producing a cobalt containing ferromagnetic iron oxide which consists essentially of adding an aqueous solution containing $Co^{+2}$ ions, an alkali solution, and an oxidizing agent to a suspension of ferromagnetic iron oxide and heating the resultant mixture at 80° to 150° C to form said cobalt containing ferromagnetic iron oxide;

the amount of $Co^{+2}$ ions in said $Co^{+2}$ ion containing aqueous solution being 0.5 to 10 atomic percent based on the iron present in the ferromagnetic iron oxide; the amount of alkali present in said alkali solution being such that after neutralization of the $Co^{+2}$ ions, the hydroxyl concentration of said mixture is at least 0.5 N; the amount of oxidizing agent, when it is a liquid or solid, being at least about 0.1 equivalent based on the $Co^{+2}$ ions and when it is a gas, said oxidizing agent being added at a rate of at least 0.1/min per liter of said resultant mixture.

2. The process of claim 1, wherein said ferromagnetic iron oxide is maghemite, magnetite, a Berthollide iron oxide of the formula $FeO_x$ in which $1.33 < x < 1.50$, or partially oxidized metallic iron.

3. The process of claim 1, wherein said oxidizing agent is selected from the group consisting of air, oxygen, hydrogen peroxide, nirate ions, nitrite ions, chlorate ions, perchlorate ions, permanganate ions and chromate ions.

4. The process of claim 1, wherein the oxidizing agent, when it is a gas, is added to the solution at a rate of 0.1 to 10 l/min.

5. The process of claim 1, wherein the amount of the oxidizing agent, when it is a liquid or solid, is 0.1 to 5 equivalents.

6. The process of claim 1, wherein the amount of the oxidizing agent is 0.5 to 2 equivalents.

7. The process of claim 1, wherein said alkali is an alkali hydroxide, an alkali carbonate, ammonia water, an aliphatic or aromatic amine, or a mixture thereof.

8. The process of claim 1, wherein aid oxidizing agent is added after adding said aqueous solution and said alkali solution.

9. The process of claim 1, wherein the heating is carried out at a temperature of 90° to 105° C.

10. The process of claim 1, wherein the oxidizing agent is added before the temperature of the system is raised to the heating temperature.

11. The process of claim 10, wherein the oxidizing agent is added after adding said aqueous solution containing $Co^{+2}$ ions and alkali solutions.

12. The process of claim 1 wherein said $Co^{+2}$ ions are derived from a water soluble cobalt salt.

13. The process of claim 12 wherein the amount of $Co^{+2}$ is 0.8 to 5 atomic percent based on the iron present in the ferromagnetic iron oxide.

14. The process of claim 1 wherein the alkali solution is added portion-wise before and after the addition of the aqueous solution containing $Co^{+2}$ ions.

15. The process of claim 1 wherein the alkali solution is added after the aqueous solution containing $Co^{+2}$ ions.

16. The process of claim 1 wherein the $Co^2$ ion containing solution is added after the alkali solution.

17. A process for producing a cobalt containing ferromagnetic iron oxide which consists essentially of adding an aqueous solution containing $Co^{+2}$ ions and at least one cation selected from the group consisting of $Cr^{+3}$, $Cr^{+6}$, $Mn^{+2}$, $Ni^{+2}$ and $Zn^{+2}$; an alkali solution; and an oxidizing agent to a suspension of ferromagnetic iron oxide and heating the resultant mixture at 80° to 150° C to form said cobalt containing ferromagnetic iron oxide;

the amount of $Co^{+2}$ ions and said cation in $Co^{+2}$ and cation containing solution being 0.5 to 10 atomic percent based on the iron present in the ferromagnetic iron oxide and the ratio of $Co^{+2}$ ion to said catioin being such that at last ⅓ of said 0.5 to 10 atomic percent is $Co^{+2}$ ion, the amount of alkali in said alkali solution being such that after neutralization of the $Co^{+2}$ ions and aid cation the hydroxyl ion concentration is at least 0.5 N; the amount of oxidizing agent when it is a liquid or solid is at least 0.1 equivalent based on said $Co^{+2}$ ions and when it is a gas it is added at a rate of at least about 0.1 l./min per liter of said resultant mixture.

18. The process of claim 17 wherein said $Co^{+2}$ ions and said at least one cation are derived from water soluble metal salts.

19. The process of claim 18 wherein the total amount of the $Co^{+2}$ ions and said at last one cation is 0.8 to 5 atmoic percent based on the iron present in the ferromagnetic iron oxide.

20. The process of claim 17 wherein the alkali solution is added portion-wise before and after the addition of the aqueous solution containing $Co^{+2}$ ions and said at least one cation.

21. The process of claim 17 wherein the alkali solution is added after the aqueous solution containing $Co^{+2}$ ions and the said at least one cation.

22. The process of claim 17 wherein the $Co^{+2}$ ion and catoion said at least one solution is added after the alkali solution.

* * * * *